US006297918B1

(12) United States Patent
Justus et al.

(10) Patent No.: US 6,297,918 B1
(45) Date of Patent: Oct. 2, 2001

(54) HYBRID THERMAL-DEFOCUSING/ NONLINEAR-SCATTERING BROADBAND OPTICAL LIMITER FOR THE PROTECTION OF EYES AND SENSORS

(75) Inventors: Brian L. Justus; Alan L. Huston; Anthony J. Campillo, all of Springfield, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 08/430,956

(22) Filed: Apr. 28, 1995

(51) Int. Cl.[7] .................................. G02B 5/23; F21V 9/00
(52) U.S. Cl. ............................................. 359/886; 359/892
(58) Field of Search ............................... 359/66, 69, 358, 359/601, 885, 886, 892

(56) References Cited

U.S. PATENT DOCUMENTS

| 3,509,063 | * | 4/1970 | Teague et al. ...................... 359/886 |
| 4,464,021 | * | 8/1984 | Brown et al. ...................... 359/886 |
| 4,890,075 | * | 12/1989 | Pohlmann ........................... 359/886 |
| 5,020,884 | * | 6/1991 | Murphy ............................... 359/892 |
| 5,080,469 | * | 1/1992 | McCahon et al. .................. 359/738 |
| 5,283,697 | * | 2/1994 | Tutt ..................................... 359/886 |
| 5,348,688 | * | 9/1994 | Sharp et al. .......................... 359/96 |
| 5,382,985 | * | 1/1995 | Becker et al. ...................... 359/614 |

OTHER PUBLICATIONS

Swartzlander et al, Int. J. Nonlinear Opt. Phys., (Singapore), vol. 2, #4, pp. 577–611, 10/93; abst. only herewith.*
Justus et al., Appl. Phys. Lett., vol. 63, #11, pp. 1483–1485, Sep. 13, 1993; abst. only herewith.*
Henc–Bartolic, et al, Acta. Phys. Slovaca, vol. 39, #3, pp. 188–192, 1989; abst. only herewith.*
Wood et al, Proc. SPIE—Int. Soc. Opt. Eng., vol. 1307, pp. 376–394, 1990; abst. only herewith.*
Bohidor, H. B., Opt. Appl;. (Poland), vol. 18, #3, pp. 221–229, 1988; abst only herewith.*
US Army—DARPA Advanced Laser Protection Program, 1989, pp. 12–14.*

* cited by examiner

*Primary Examiner*—Nelson Moskowitz
(74) *Attorney, Agent, or Firm*—John J. Karasek; L. George Legg

(57) ABSTRACT

A passive optical limiter for protecting a light-sensitive object from damage due to an incident light beam above a first predetermined value of light intensity is disclosed. The passive optical limiter comprises: a first lens for focusing an incident light beam to a focal point; a protective element disposed near the focal point, the protective element being responsive to a focused incident light beam below the first predetermined intensity level for passing therethrough the focused incident light beam below the first predetermined intensity level, the protective element being responsive to a focused incident light beam between the first predetermined intensity level and a higher second predetermined intensity level for deflecting substantially all of the focused incident light beam into rings of light and passing therethrough only a small portion of the converged incident light beam between the first and second predetermined intensity levels, and the protective element including a scattering element responsive to incident light at or above the second predetermined intensity level for scattering that incident light in all directions to decrease the intensity level of the incident light below a damage threshold of the light sensitive object; and a second lens for focusing substantially all of the light passing through the the protective element and the second lens onto the light-sensitive object.

31 Claims, 10 Drawing Sheets

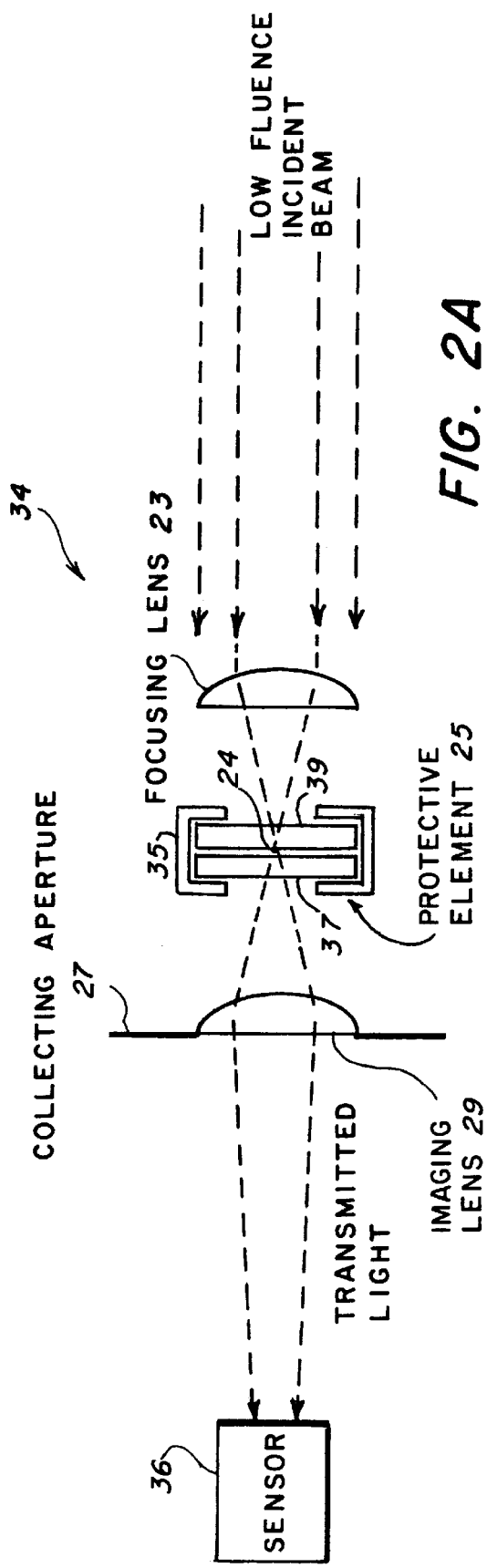
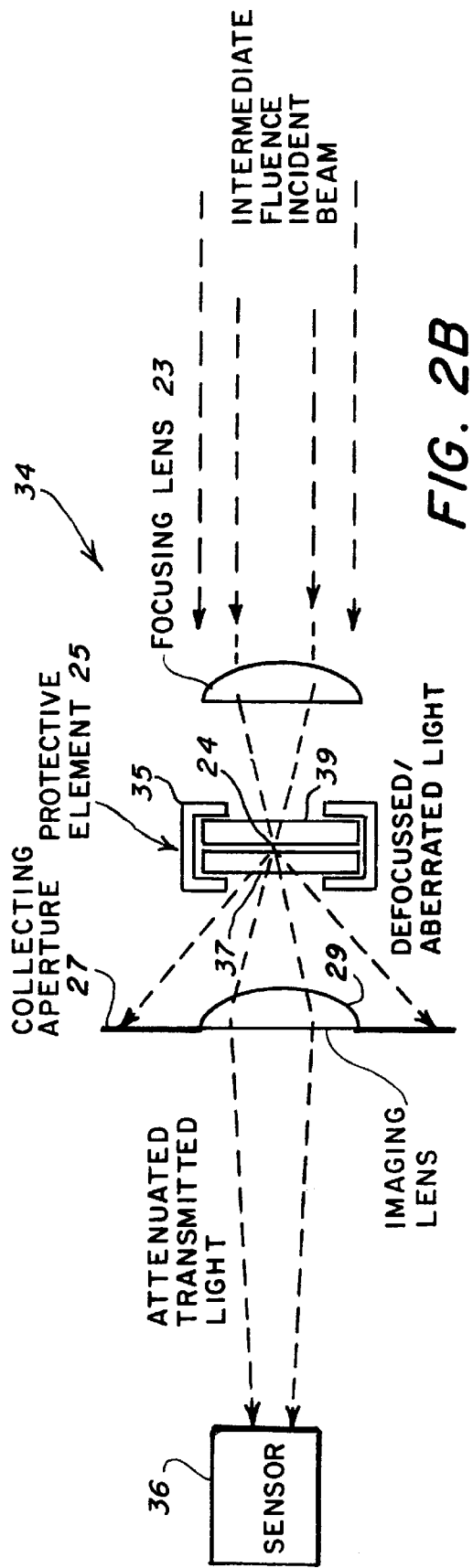

HYBRID THERMAL-DEFOCUSING/ NONLINEAR-SCATTERING BROADBAND OPTICAL LIMITER FOR THE PROTECTION OF EYES AND SENSORS

CROSS-REFERENCE TO RELATED APPLICATION

This application is related to commonly assigned, U.S. Pat. No. 5,491,579, filed on May 31, 1994 by Justus, Huston and Campillo and entitled "Broadband Thermal Optical Limiter For The Protection Of Eyes And Sensors".

BACKGROUND OF THE INVENTION

1. Field of the Invention

The present invention relates to optical limiters and particularly to a hybrid passive optical limiter for protecting eyes and sensors from intense visible and near infrared laser radiation by utilizing a thermal-defocusing mechanism to limit light within a first intensity range and by utilizing a nonlinear scattering mechanism to limit light having an intensity above the first intensity range.

2. Description of the Related Art

The protection of eyes and sensors from damage due to sources of intense light, such as laser radiation, is a problem of current interest in both commercial and military environments. Nonlinear optical materials (materials whose optical properties, such as the index of refraction or absorption coefficient, are dependent on the intensity of the incident light) have been used in passive optical devices designed to reduce or limit the fraction of light transmitted through the device as the incident intensity is increased.

The simplest optical geometry used in such a device is a dual lens (focus and recollimate) arrangement, chosen because of the large optical magnifications (high light intensities) which can be achieved in the nonlinear material, also because it can offer a wide field of view (critical for eye vision), and finally because it is a common scheme which occurs in many devices of interest to the military (such as, for example, periscopes, binoculars, gunsights and missile guidance systems) and to commerce (such as, for example, various laser applications).

The first lens (focusing lens) of such a dual lens arrangement focuses the incident beam onto a suitable material to maximize the nonlinear optical effects of the available energy. At low intensities, the nonlinear element has little effect on the beam and a second lens (imaging lens) of such a dual lens arrangement recollimates the light for transmission to the eye or sensor optics. However, it should be noted that in practice a second dual lens arrangement would be required to reinvert the image for vision applications. In combination with the lenses, entrance and collecting apertures establish the relevant f/number of the arrangement. When adjusted to the same size as the entrance aperture, the collecting aperture passes substantially 100% of the low intensity light. At high intensities, the nonlinear element defocuses the light, overfilling the collecting aperture, which spatially truncates and limits the magnitude of the transmitted beam.

The prior art in such defocusing limiters has utilized the electronic ($\chi^{(3)}$) or orientational (Kerr) nonlinearities of semiconductors or organic compounds to defocus the incident light. There are a number of important requirements that must be met by the nonlinear material if it is to be used as the protective element in a defocusing optical limiter. These important requirements are:

1. It must possess a large, defocusing nonlinearity that, for the application of eye protection, is sufficient to limit the transmitted fluence to levels considered to be safe for retinal exposure (<0.5 $\mu J/cm^2$). For sensor protection the transmitted fluence must be below the sensor damage threshold.

2. For eye protection, it must have a broadband spectral response to provide protection over all vision response wavelengths. For sensor protection, response over the entire ultraviolet/visible/infrared spectrum is required, depending on the sensor responsivity.

3. It must have high transmission of the low intensity light.

4. It must be compatible with low f/number optics.

5. It must have a large refractive index change ($\Delta n_{sat} > 0.1$) before saturation occurs.

6. The material must have a fast yet persistent temporal response. In particular, limiting against Q-switched pulses in the range of 6 ns (nanoseconds) to 100 ns is generally regarded as the most important temporal regime and represents an absolute minimum material requirement.

7. It must possess either a high threshold for optical damage or the ability to recover between shots.

These seven requirements pose a severe test that has not been passed satisfactorily by currently available refractive materials. In particular, the low f/number requirement leading to the need for large $\Delta n_{sat}$ rules out most materials. The requirement for broadband response rules out the use of resonant semiconductor or organic nonlinearities. Nonresonant nonlinearities, although broadband, fail the requirements specified in paragraphs 1, 5 and 6 above.

Thermally induced refractive index changes in gases, solids and liquids are well understood. At high light intensities, refractive thermal blooming is accompanied by thermal aberrations which spatially redistribute the beam so that a significant amount of the energy originally in the center appears as rings at large angles with respect to the propagation direction of the light. These rings are conveniently blocked by an aperture thereby limiting the transmitted energy. A purely refractive thermal mechanism was proposed some time ago for the control of the output power of a cw (continuous wave) laser. However, it has been commonly assumed that the temporal response of a purely thermal mechanism is too slow to yield effective optical limiting of high energy, ns duration laser radiation. In fact, for a tightly focused beam the build-in time of the refractive nonlinear response can be on the order of a nanosecond.

The present inventors have described in the above cross-referenced, related U.S. application Ser. No. 08/251,146 now U.S. Pat. No. 5,491,579 a broadband thermal optical limiter capable of protecting eyes and sensors from sources of light of high intensity, such as Q-switched lasers. That limiter operated by the mechanisms of thermal defocusing (blooming) and thermal aberration. At low incident intensities light is transmitted by the limiter with little effect other than a small decrease in transmission (25% to 50%) due to a broadband absorbing dye. At higher light intensities thermal defocusing expands the central portion of the transmitted beam and redistributes most of the energy into rings at a large angle with respect to the propagation direction of the light. The rings are then conveniently blocked by an aperture (f/5 optics). The advantages of the broadband thermal limiter were: 1) The spectral response was truly broadband, extending from the blue to the near infrared (IR). 2) The transmitted fluence was limited to levels below the maximum permissible exposure level of the human eye. 3) The response time was sub-nsec for low f/# optics with protection for pulse durations up to tens of microseconds. 4) The damage threshold was very high.

SUMMARY OF THE INVENTION

It is therefore an object of the invention to provide an improved optical limiter.

Another object of the invention is to provide an optical limiter for limiting the intensity of a high power incident laser beam.

Another object of the invention is to provide an optical limiter which passes low energy light therethrough, but only passes a relatively small portion of high or intense energy light therethrough.

Another object of the invention is to provide a passive optical limiter for protecting eyes and sensors from intense visible and near infrared laser radiation.

Another object of the invention is to provide a passive optical limiter for protecting a light-sensitive object from damage due to an incident light beam above a predetermined value of light intensity.

Another object of the invention is to provide an optical limiter which provides an improved temporal response in the range from nanoseconds (ns) to milliseconds (ms).

Another object of the invention is to provide a broadband thermal-defocusing/scattering optical limiter for protecting a light-sensitive object from intense laser beams at or near ultraviolet, visible and near infrared wavelengths above a predetermined value of light intensity.

Another object of the invention is to provide a hybrid, thermal/nonlinear scattering optical limiter which substantially passes incident light pulses below a first predetermined intensity level, limits incident light pulses between first and second predetermined intensity levels by using a thermal defocusing mechanism, and limits incident light pulses above the second predetermined intensity level by using a thermally induced scattering mechanism.

Another object of the invention is to provide a broadband thermal-defocusing/scattering optical limiter which performs thermal-defocusing limiting of incident light pulses between first and second predetermined intensity levels and performs additional limiting of those incident light pulses by causing thermally induced scattering of the incident light pulses in all directions to occur at or above the second predetermined intensity level to decrease the intensity level of the incident light pulses below a damage threshold of a light sensitive object.

Another object of the invention is to provide an optical limiter which includes in a cell an absorbing material dissolved in a solvent for thermally defocusing substantially all incident light between first and second intensity levels and which cell further contains a scattering structure which causes substantial scattering of incident light above the second intensity level to occur.

A further object of the invention is to provide a broadband thermal-defocusing/scattering optical limiter which performs thermal-defocusing limiting of incident laser pulses between first and second predetermined levels of those laser pulses by disposing in a cell a solution comprised of broadband-absorbing dye Nigrosin dissolved in carbon-disulfide, and performs additional limiting of those incident laser pulses at or above the second predetermined intensity level by causing thermally induced scattering to occur when either surface-roughened glass windows, the refractive index of which matches the refractive index of the solution, of the cell are in contact with the dye solution or index matched microscopic glass fibers are added to the solution in the cell.

These and other objects of this invention are achieved by providing a passive optical limiter for protecting a light-sensitive object from damage due to an incident light beam above a first predetermined value of light intensity. The passive optical limiter comprises: a first lens for focusing an incident light beam to a focal point; a protective element disposed near the focal point, the protective element being responsive to a focused incident light beam below the first predetermined intensity level for passing therethrough the focused incident light beam below the first predetermined intensity level, the protective element being responsive to a focused incident light beam between the first predetermined intensity level and a higher second predetermined intensity level for deflecting substantially all of the focused incident light beam into rings of light and passing therethrough only a small portion of the converged incident light beam between the first and second predetermined intensity levels, and the protective element including a scattering element responsive to incident light at or above the second predetermined intensity level for scattering that incident light in all directions to decrease the intensity level of the incident light below a damage threshold of the light sensitive object; and a second lens for focusing substantially all of the light passing through the the protective element and the second lens onto the light-sensitive object.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIG. 2A illustrates a schematic diagram of the optical limiter of the invention under an operational condition of an incident low intensity light beam;

FIG. 2B illustrates a schematic diagram of the optical limiter of the invention under an operational condition of an incident intermediate intensity light beam;

DETAILED DESCRIPTION OF THE PREFERRED EMBODIMENT

Figure 1:
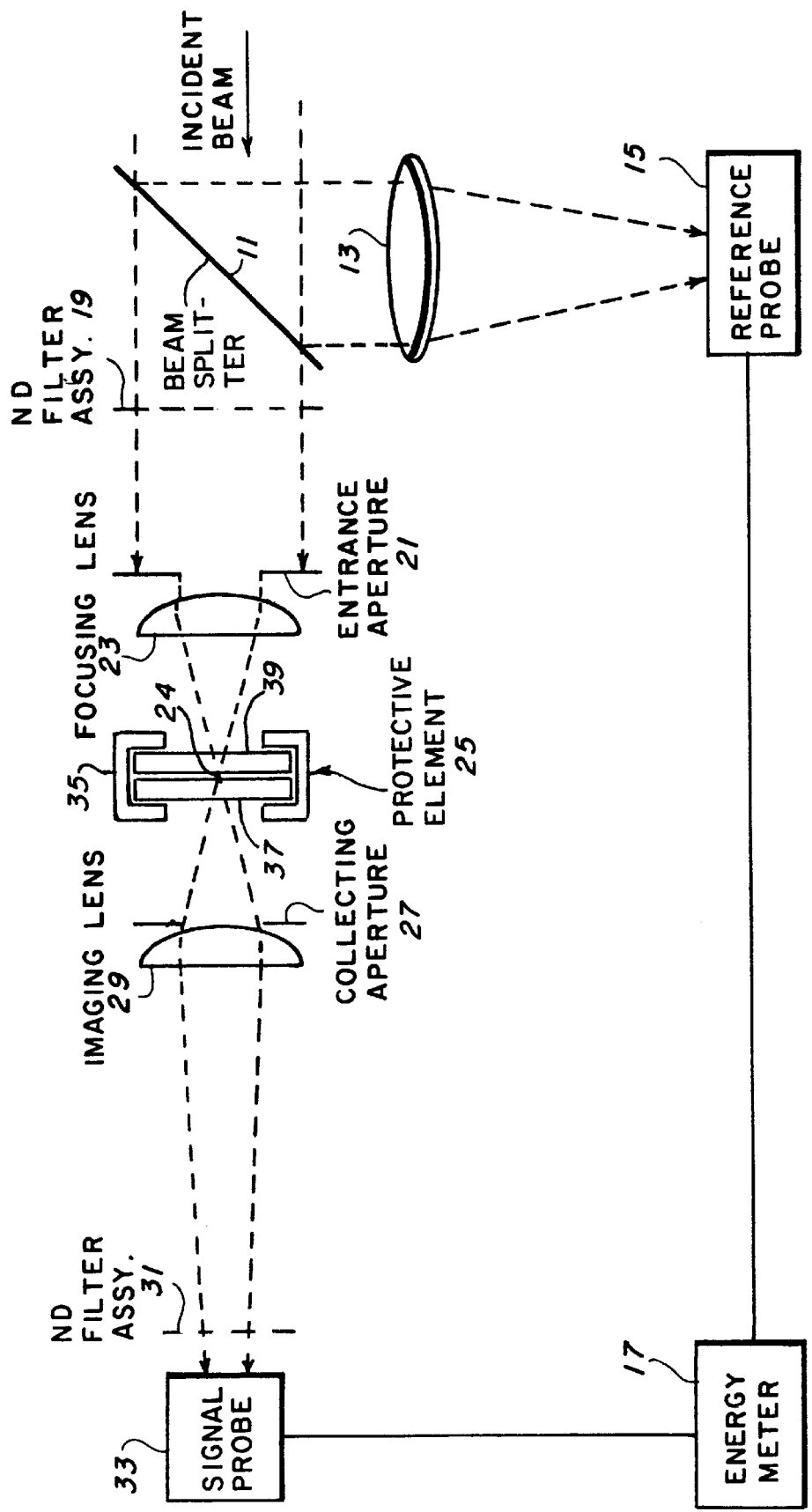
FIG. 1 illustrates a schematic diagram of the optical limiter of the invention utilized in an experimental system.

Referring now to the drawings, FIG. 1 illustrates a schematic diagram of a low f/number defocusing optical limiter apparatus of the invention utilized in an experimental system to characterize the invention. In the experimental system of FIG. 1, diffraction-limited f/5 experiments were performed at 532 nanometers (nm) with 6-nanosecond (ns)-duration pulses from a frequency-doubled Q-switched Nd:YAG laser (not shown).

In the operation of the system of FIG. 1, the incident light beam from the laser is applied to a beam splitter (BS) 11. This incident light beam had a Gaussian spatial profile expanded to a $1/e^2$ diameter of 30 mm. About 8% of the incident beam reflects off of the beam splitter 11 and passes through a lens 13 which focuses the light into a reference probe 15. This reference probe 15 is a detector which measures the incident energy by converting the 8% portion of the incident light applied thereto into an analog electrical signal. The analog electrical signal from the reference probe 15 is then applied to an energy meter 17 which converts the analog signal into a digital signal which is digitally read out of the energy meter as the incident energy applied to the system of FIG. 1. Since the amount of incident light being applied to the reference probe 15 is known to be 8% of the total incident light applied to the system of FIG. 1, the energy meter 17 can be readily calibrated to indicate 100% of the total incident energy being received by the system of FIG. 1.

Since 8% of the total incident light is reflected by the beam splitter, the remaining 92% of the total incident light is transmitted through the beam splitter 11 to a neutral density (ND) filter assembly 19. The neutral density filter assembly 19 attenuates the incident light beam such that the transmission varies from about 0.001 to about 0.5, depending on the specific filters used in the neutral density filter assembly 19.

It will be recalled that the incident beam had a Gaussian spatial profile expanded to a $1/e^2$ diameter of 30 mm. This incident beam from the neutral density filter 19 is truncated by a 10 mm diameter, entrance aperture 21 placed immediately before a focusing lens 23. The truncation yielded a top hat spatial profile. The focusing lens 23 is a 50 mm focal length, double-element lens which focuses the truncated incident beam to a focal point 24 inside of a sample cell, sample, cell or protective element 25. The $1/e^2$ radius of the beam at the focal point 24, in air, is 3.0 $\mu$m.

The protective element 25 of the invention operates as a hybrid thermal-defocusing/scattering limiter which passes incident light at low fluences below a first predetermined intensity level or low fluence level below about 0.1 $\mu$J, thermally limits or defocuses light at low-to-intermediate fluences between first and second predetermined intensity levels between about 20 $\mu$J and about 25 $\mu$J, and transitions to a thermal scattering mechanism at high fluences above the second predetermined intensity level.

A key feature of the thermal limiter, which operates between the first and second predetermined intensity levels, was that the change in the index of refraction of the limiting medium is very large at high intensities. It was this key feature which was observed by the present inventors that led them to designing and demonstrating the present hybrid thermal/nonlinear scattering limiter of the present invention. The present invention relies on the large index change of the thermal medium at high intensities to permit scattering of the light from a random dielectric surface (to be explained). The operation of the hybrid thermal/scattering limiter is essentially identical to that of a purely thermal limiter (of the above-identified U.S. Pat. No. 5,491,579) at low and intermediate incident fluences, but is significantly improved in comparison to the purely thermal limiter at high incident fluences.

Thermal/scattering optical limiting was demonstrated using solutions of an organic dye, nigrosin, dissolved in carbon disulfide ($CS_2$), a thermal solvent which possesses an excellent refractive thermal nonlinearity. The nigrosin simply acted to absorb light and then transfer heat to the solvent. Nigrosin is characterized by an extremely broad and flat absorption over the entire visible and near IR spectral regions.

Figure 5:
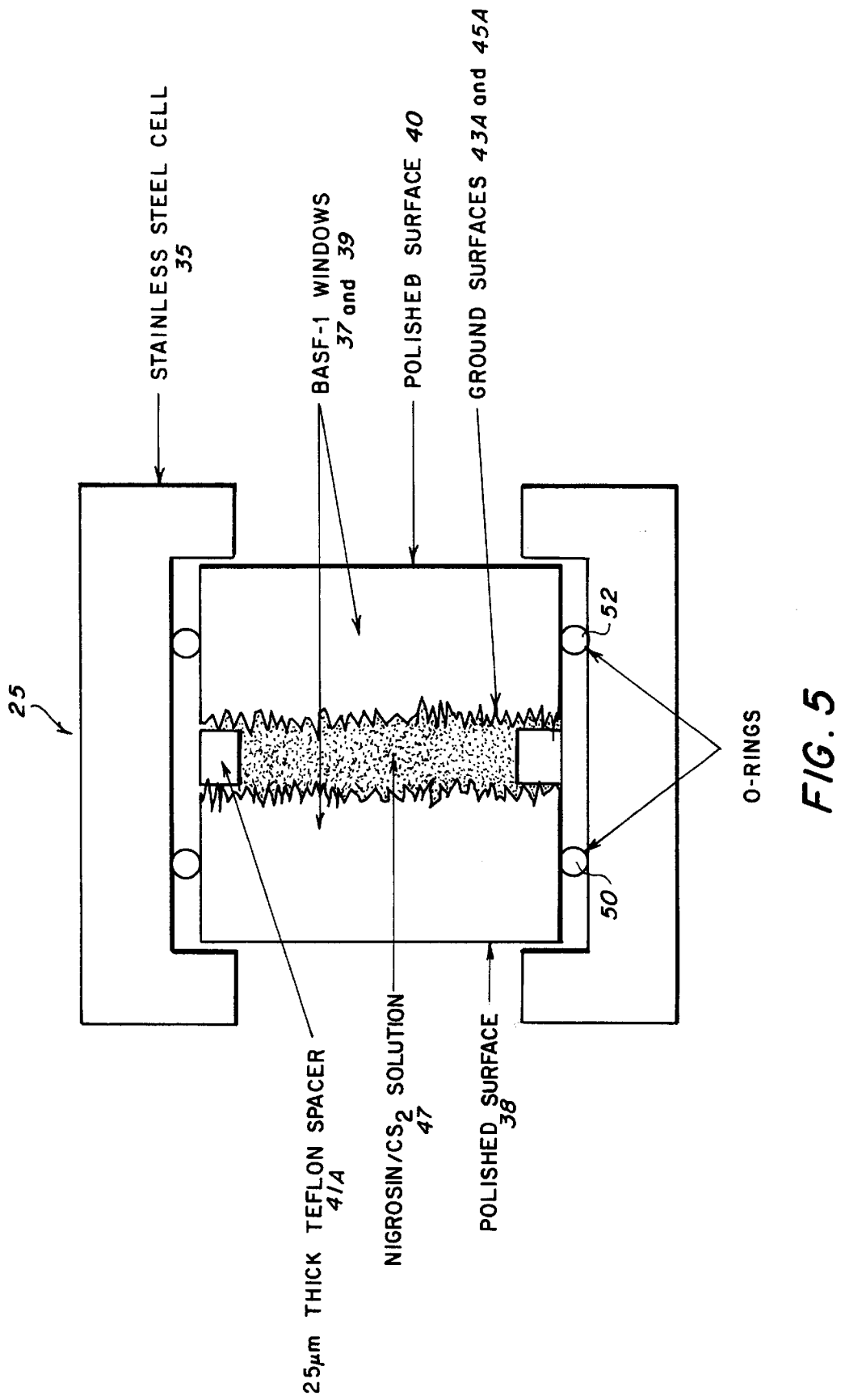
FIG. 5 illustrates the protective element of the optical limiter, showing a first embodiment of the stainless steel cell that contains a solution of absorbing material disolved in a solvent and showing how scattering is introduced into the cell by roughening the inner surfaces of the two windows of the cell.
Figure 7:
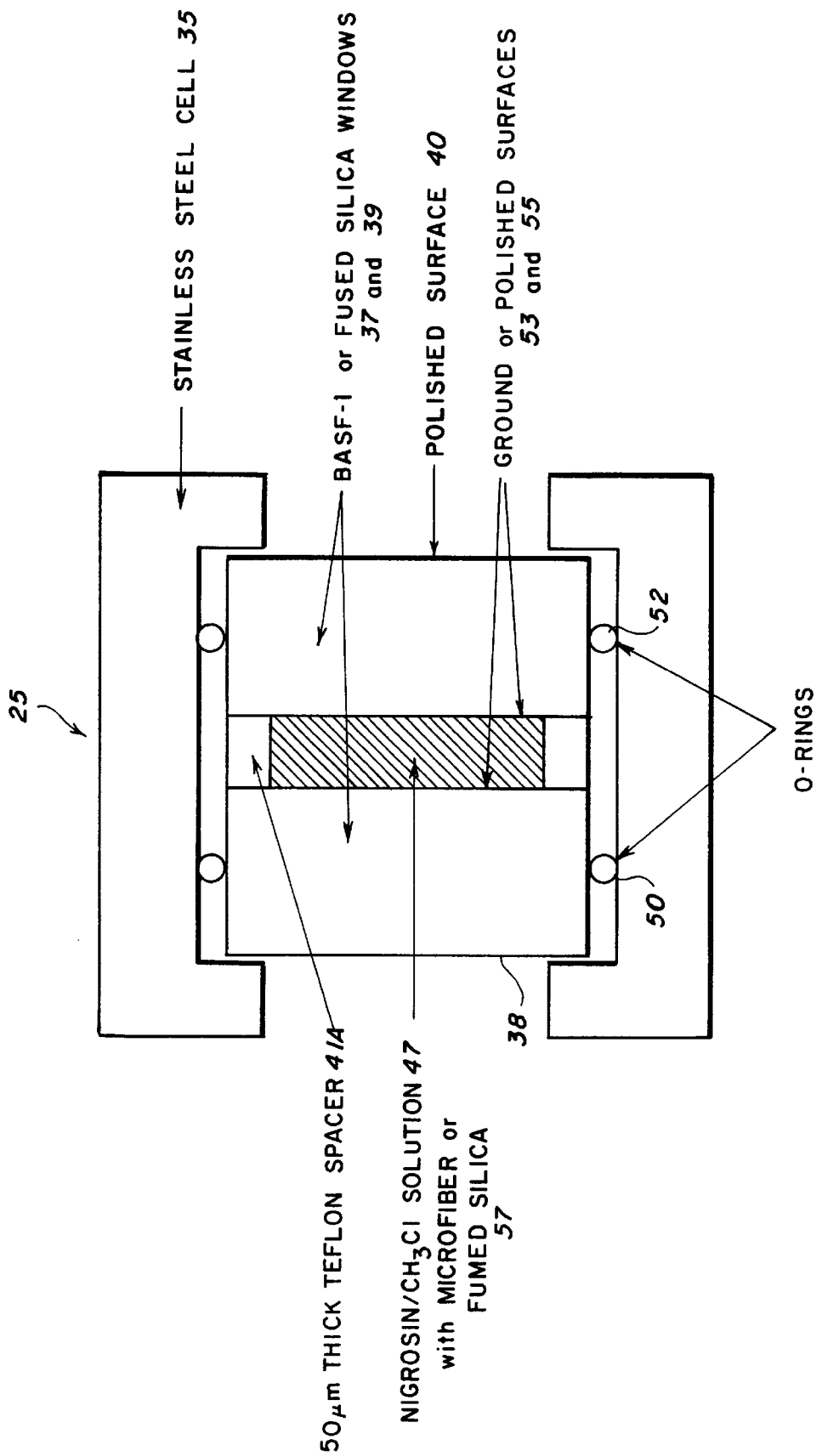
FIG. 7 illustrates the protective element of the optical limiter, showing a second embodiment of the stainless steel cell that contains a solution of absorbing material dissolved in a solvent and showing how scattering is introduced into the cell by using glass microfibers instead of, or in addition to, ground glass to scatter light.

The protective element or sample cell or optical limiting device 25 used in various limiting measurements is comprised of a stainless steel cell 35 holding two 1" diameter by ¼ thick BASF-1 windows 37 and 39 separated by a 25 $\mu$m thick teflon gasket or spacer 41A (FIGS. 5 and 7). The window material that was used, BASF-1, was chosen because its index of refraction identically matches that of $CS_2$ ($n_0$ BASF-1=1.626, $n_0$ $CS_2$=1.627). The cell 25 is filled with an absorbing material solution of nigrosin dissolved in the $CS_2$ thermal solvent, with the solution possessing refractive thermal nonlinearities. A scattering element (to be discussed in relation to each of FIGS. 5 and 7) is also contained in the cell 25.

When the cell 25 is filled with nigrosin/$CS_2$ solution and illuminated with low intensity light, due to the perfect index match between the scattering element and the solution, the cell 25 appears optically clear and highly transmitting. If the sample cell 25 is viewed dry, without the solution, the appearance is highly opaque and the transmission is only about 3%.

As will be explained later, the sample cell or protective element 25 is responsive to a focused incident light beam below a first predetermined intensity level for passing therethrough the focused incident light beam below the first predetermined intensity level; and the sample cell 25 is also responsive to a focused incident light beam between the first predetermined intensity level and a higher second predetermined intensity level for deflecting substantially all of the focused incident light beam in different directions and passing therethrough only a small portion of the converged incident light beam between the first and second predetermined intensity levels. Thus, the sample cell 25 provides no optical limiting of light passing through the sample cell 25 when the intensity of that light is below the first predetermined intensity level, but does provide a relatively large amount of optical limiting of light by defocusing and producing strongly aberrated rings of light when the intensity of light passing through the sample cell 25 is between the first and second predetermined intensity levels (to be explained). Furthermore, when the intensity of the incident light passing through the sample cell 25 is above a scattering level (above the second predetermined intensity level of about 25 $\mu$J), the scattering element in the cell 25 will scatter substantially all of the light in all directions. As a result, only a small portion of the scattered light will pass through the collecting aperture 27.

Light from the sample cell 25 passes through a 10 mm collecting aperture 27 which provides 100% transmission at low intensities of that light and blocks any strongly aberrated rings of light produced by the sample cell 25 in response to high intensities of that light. A 50 mm plano-convex imaging lens 29 is disposed right after the collecting aperture 27 to collect light passing through the collecting aperture 27 and to direct that collected light through a neutral density filter assembly 31 into a signal probe 33.

The neutral density filter assembly 31 allows a known fraction of the light to be transmitted therethrough and absorbs a known fraction of the light. This filter assembly 31 passes about 0.1% to about 50% of the light that is applied to the assembly 31, depending on the specific filters used in the neutral density filter assembly 31. The neutral density filter assembly 31 is similar in structure and operation to the neutral density filter 19 and, hence, requires no further description.

The signal probe 33 is a detector which measures the transmitted energy by converting the portion of the incident light that is applied thereto as transmitted light into an analog electrical signal. The analog electrical signal from the signal probe 33 is then applied to the energy meter 17 which converts the analog signal into a digital signal which is digitally read out of the energy meter 17 as the transmitted energy that is applied to the signal probe 33. The energy meter 17 can read each of the probes 15 and 33 and provide a dual reading.

All of the limiting data were obtained using single shots in order to avoid cumulative thermal effects or sample boiling. The reference pulse energies were measured with a calibrated pyroelectric energy meter, obtained from Laserprobe, Inc., Utica, N.Y. and having part number RJP-735. The transmitted pulse energies were measured with a more sensitive silicon photodetector energy meter operated in the linear regime, obtained from Laserprobe, Inc. and having part number RJP-765. The energy meter 17 was obtained from Laserprobe, Inc. and has part number RJ-7620. The incident energy was adjusted by rotation of a half-wave plate used in conjunction with a Glan prism and calibrated neutral density filter assembly 19.

Figure 2C:
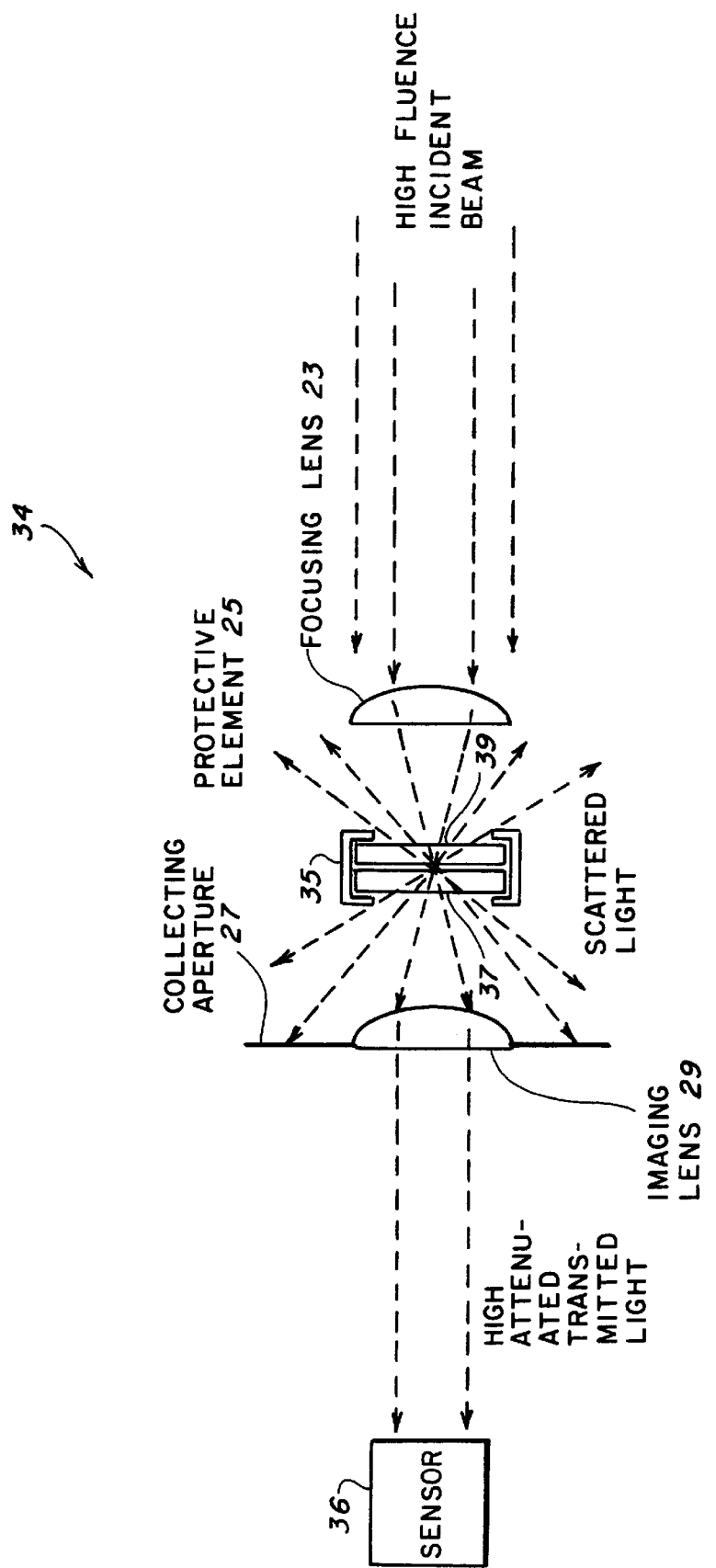
FIG. 2C illustrates a schematic diagram of the optical limiter of the invention under an operational condition of an incident high intensity light beam.

FIGS. 2A, 2B and 2C illustrate schematic diagrams of the optical limiter apparatus of the invention under different operational conditions. Each of FIGS. 2A, 2B and 2C use the focusing lens 23, the protective element, sample cell, sample or cell 25, the collecting aperture 27 and the imaging or collecting lens 29 that are shown in FIG. 1. Each of these elements 23, 25, 27 and 29 in each of FIGS. 2A, 2B and 2C have the same structure and perform the same function as the corresponding elements shown in FIG. 1 and, hence, require no further description and discussion. However, in each of FIGS. 2A, 2B and 2C, the light transmitted through the imaging lens 29 is imaged onto an object to be protected, such as a sensor or human eye 36, rather than onto the signal probe 33 of FIG. 1.

In the operation of the thermal/scattering optical limiter 34 of FIG. 2A, a low fluence incident beam is focused by the focusing lens 23 to a focal point located at or near the center of the sample or protective element 25 (to be discussed later). Since this incident beam is a low fluence beam having an intensity below the first predetermined threshold level, it passes through the protective element 25 without being defocused by the protective element 25, and then passes through the collecting aperture 27 and imaging lens 29 to the sensor 36 to be monitored.

In the operation of the thermal/scattering optical limiter 34 of FIG. 2B, an intermediate fluence incident beam is focussed by the focusing lens 23 to the focal point located at or near the center of optical limiter, sample or protective element 25 (to be discussed later). Since this incident beam is at an intermediate fluence level between the first and second predetermined threshold levels, the sample or protective element 25 defocuses the intermediate fluence incident beam, causing that incident beam to be strongly aberrated into several rings of aberrated light which are blocked by the collecting aperture 27. Only a strongly attenuated small portion of unaberrated light from the incident beam will be transmitted through the collecting aperture 27 and imaging lens 29 to be monitored by the sensor or eye 36 without damage to the sensor or eye 36.

In the operation of the thermal/scattering optical limiter 34 of FIG. 2C, a high fluence or high intensity incident beam, having a incident energy of greater than 25 $\mu J$ is focused by the focusing lens 23 to the focal point located at or near the center of the protective element or cell 25. Since this incident beam is a high fluence beam at or above the second predetermined threshold level for scattered light of about 25 $\mu J$, the thermal nonlinearity of the nigrosin/$CS_2$ solution has saturated and the limiting is largely dependent on the scattering efficiency of the scattering element (to be discussed) in the nigrosin/$CS_2$ solution in the cell or protective element 25.

Figure 3A:
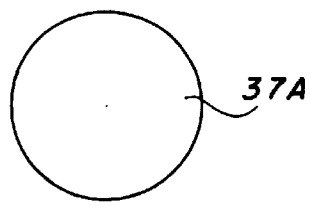
FIG. 3A illustrates the beam profile of incident light for all intensities and the beam profile of transmitted low intensity light at the collecting aperture.
Figure 3B:
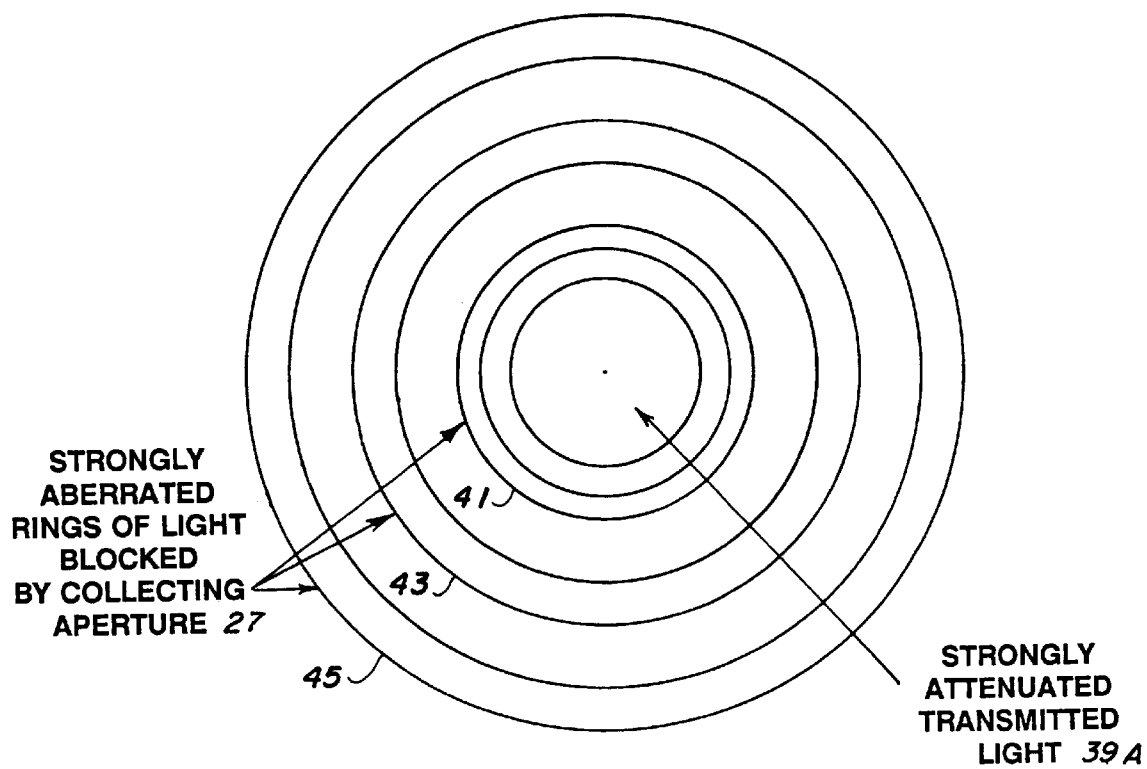
FIG. 3B illustrates the beam profile at the collecting aperture of the transmitted light for incident intermediate intensity light below the threshold for scattering.
Figure 3C:
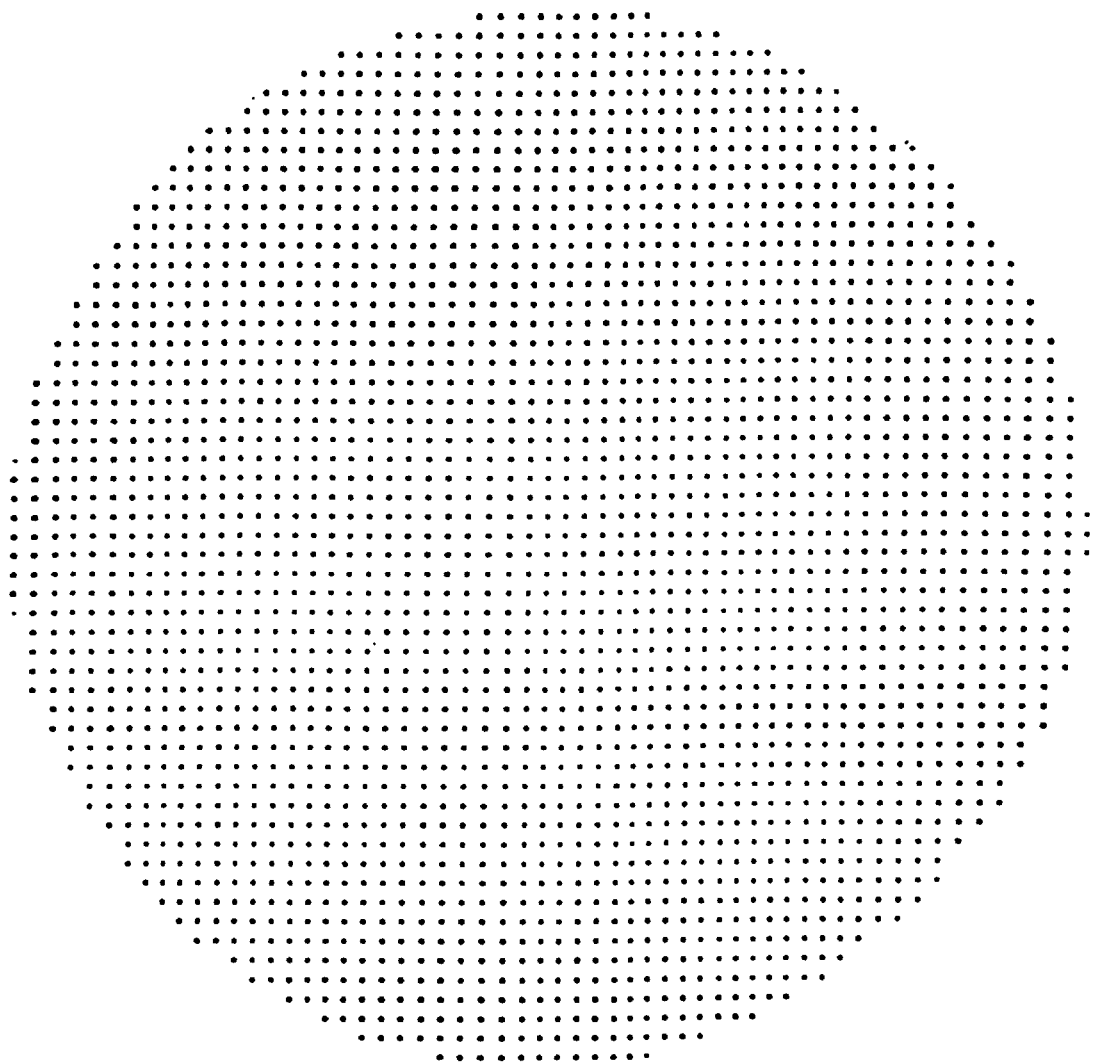
FIG. 3C illustrates the beam profile at the collecting aperture of the transmitted light for incident high intensity light above the threshold for scattering.

FIGS. 3A, 3B and 3C illustrate the optical limiting operation of the optical limiter 34 of FIGS. 2A, 2B and 2C in response to the low, intermediate and high fluence incident light beams respectively shown in FIGS. 2A, 2B and 2C.

FIG. 3A shows the beam profile of an incident light beam 37A for all intensities (low, intermediate and high) of incident light or an incident light beam, and the beam profile of low intensity light at the collecting aperture 27 of FIG. 1.

FIG. 3B shows the beam profile of the light beam 37A at the collecting aperture 27 for intermediate incident fluences below the second predetermined threshold (of about 25 $\mu J$) after the beam was defocused by the nigrosin/$CS_2$ solution in the cell 25 into an exemplary series of concentric strongly aberrated rings 41, 43 and 45 of light. The collecting aperture 27 blocks these strongly aberrated rings 41, 43 and 45 of light, while passing therethrough to the eye or sensor 36 only the strongly attenuated transmitted light 39A (that remains from the light beam 37A).

FIG. 3C shows the beam profile at the collecting aperture 27 for high incident fluence above the threshold for scattering (above about 25 $\mu J$). Note that the high incident fluence light is shown being scattered (by the scattering element) in all directions. Therefore, only a very small portion of this scattered light will pass through the collecting aperture 27 and be focused by the imaging lens 29 onto the sensor 36.

As stated above, optical limiting of the thermal optical limiter apparatus 34 (of FIGS. 2A, 2B and 2C) was demonstrated using solutions of an organic dye, nigrosin, dissolved in a thermal solvent, such as preferably carbon disulfide ($CS_2$), which possess excellent refractive thermal nonlinearities. Other thermal solvents that may be used are carbon tetrachloride ($CCl_4$), methanol (MeOH) and chloroform ($CHCl_3$). The nigrosin is an absorber which simply acts to absorb light to heat up and then transfer that heat to the thermal solvent in which the nigrosin was dissolved.

A thermal solvent can be defined as any substance (solid, liquid or gas) that exhibits a change in index of refraction upon heating. An absorber can be defined as any substance or material that absorbs electromagnetic energy and transforms that energy into thermal energy in a surrounding medium.

A water soluble form of nigrosin was used in this work. Nigrosin (which is supplied by the Aldrich Chemical Co., Milwaukee, Wis.) is characterized by an extremely broad and flat absorption over the entire visible and near IR spectral regions.

Figure 4:
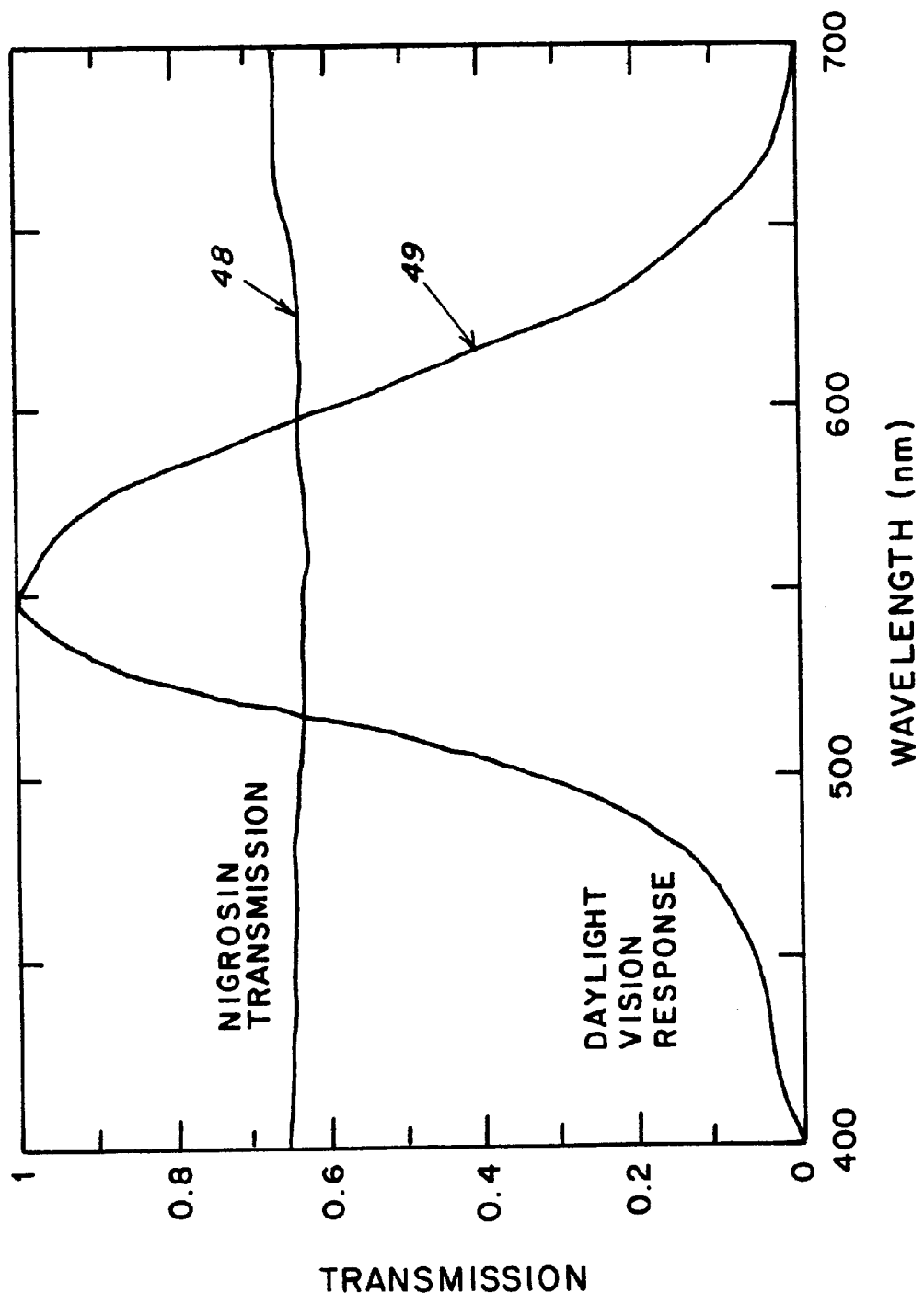
FIG. 4 shows the transmission spectrum of a nigrosin solution compared to the daylight vision response curve of the human eye.

FIG. 4 shows the transmission spectrum curve 48 of a nigrosin solution (not shown) compared to the daylight vision response curve 49 of the human eye. However, it should be noted that the present invention does not depend on the use of nigrosin as the absorber. Nogrosin is simply an example of a dye with a broadband absorption. Any other material that has a broad, flat absorption and that dissolves in a good thermal solvent will work equally as well as the nigrosin. The optical limiting device used in these limiting measurements consisted of a stainless steel cell or sample 25 holding two 1" diameter by ¼ thick index-matched windows (not shown) separated by a teflon gasket (not shown) 25 $\mu$m to 50 $\mu$m thick. The nigrosin solution was placed between the windows and sealed with an o-ring (not shown) upon assembly of the cell 25.

As stated above, FIG. 4 shows the transmission spectrum curve 48 of a nigrosin solution compared to the daylight vision response curve 49. The daylight vision response curve 49 is the response curve of the human eye and covers the wavelength range from 400 nm to 700 nm. The human eye can only see light that is underneath the curve 49 and that has wavelengths within this 400–700 nm wavelength range. The response of the human eye to light peaks at about 550 nm, which is where the eye can see most efficiently and then drops sharply off on the sides down to 400 nm and to 700 nm. For example, with two incident light sources of equal brightness, one at 400 nm and the other at 550 nm, the eye would see the 550 nm light as being very bright, but would hardly see the 400 nm light because the eye cannot respond to the 400 nm light.

For eye protection, the thermal/scattering optical limiter apparatus 34 of the invention must limit the intensity of light within this 400–700 nm wavelength range. For protecting the eye from wavelengths below 400 nm and above 700 nm, filters (not shown) could be inserted before, for example, the focusing lens 23 (FIGS. 2A, 2B and 2C) of the optical limiter apparatus 34 to block such wavelength ranges. For protection of a sensor 36, filters may not be needed, depending on the particular sensor being used.

Note that the nigrosin transmission response 48 in FIG. 4 is relatively flat across across the entire 400–700 nm daylight vision response curve 49 of the human eye to provide good eye protection over this wavelength range. This means that the nigrosin sample or cell 25 will respond equally well to any wavelength within the 400–700 nm range. The nigrosin sample 25 is the optical limiter of the thermal optical limiter apparatus 34.

FIG. 5 illustrates a first embodiment of the thermal-defocusing/scattering cell or protective element 25 of the hybrid thermal-defocusing/nonlinear-scattering broadband optical limiter of the invention shown in FIGS. 2A, 2B and 2C. More specifically, FIG. 5 illustrates the protective element 25 of the optical limiter of the invention, showing the stainless steel cell 35 holding the two exemplary 1" diameter by ¼ thick BASF1 windows 37 and 39 separated by an exemplary 25 $\mu$m thick teflon gasket or spacer 41A. The BASF-1 windows 37 and 39 have polished outside surfaces 38 and 40. However, on the inside of the BASF-1 windows 37 and 39, the surfaces were ground using an exemplary 32 $\mu$m grit polishing powder to yield ground surfaces 43A and 45A which form highly scattering rough interfaces. Nigrosin/$CS_2$ solution 47 was placed between the windows 37 and 39 and sealed with o-rings 50 and 52.

In operation, at low incident intensities light is transmitted by the thermal/scatterer optical limiter of the invention with little effect other than a small decrease in transmission due to a broadband absorbing dye, nigrosin/$CS_2$ solution. At intermediate light intensities (between about 0.1 $\mu$J and about 25 $\mu$J) thermal defocusing expands the central portion of the transmitted beam and redistributes most of the energy into rings at a large angle with respect to the propagation direction of the light. The rings are then conveniently blocked by the collecting aperture 27. At high light intensities above the scattering threshold of about 25 $\mu$J, a large change occurs in the index of refraction of the nigrosin/$CS_2$ thermal medium, which causes the incident high intensity light to scatter in all directions from the ground surfaces 43A and 45A of the BASF-1 windows 37 and 39.

Figure 6:
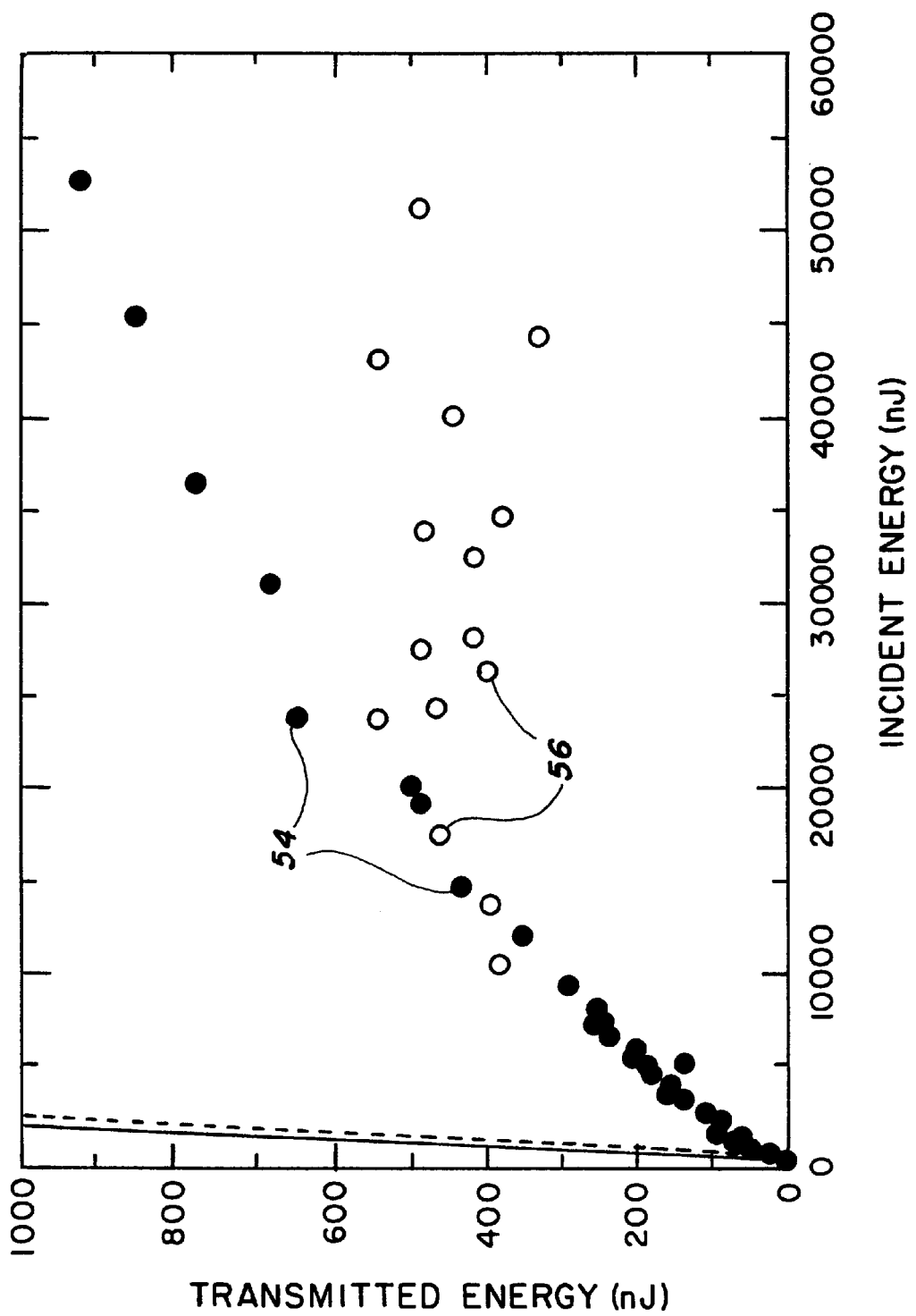
FIG. 6 illustrates experimental data showing the performance of the optical limiter using the protective element of FIG. 5, compared to a broadband thermal limiter without the ground glass.

FIG. 6 illustrates thermal-defocusing/ground-glass scattering limiting experimental data showing the performance of the optical limiter of the invention using the protective element of FIG. 5, compared to a broadband thermal limiter without the ground glass. The transmitted energy versus incident energy is plotted for a limiter constructed with solutions of nigrosin/$CS_2$ and cell windows 37 and 39 separated by a 25 $\mu$m thick Teflon gasket or spacer 41A. The filled or solid circles 54 represent purely thermal limiting data obtained by the use of polished BASF-1 windows (to be discussed), as shown in FIG. 3B, without any scattering. The open circles 56 represent scattering data obtained by the use of the ground glass windows 37 and 39 of FIG. 5, as shown in FIGS. 3A, 3B and 3C.

Also shown by open circles is limiting data obtained with the same nigrosin solution and 25 $\mu$m spacer separating two BASF-1 glass windows, each polished on one side and ground on the side adjacent to the solution. In this case T=38% because the effective path length was increased due to the porous nature of the ground glass surface. (The effective path length was increased to about 30 $\mu$m.) The dashed line is the system transmission of the hybrid scattering limiting cell. At an incident energy of about 20 $\mu$J, the limiting behavior of the thermal/scattering hybrid limiter departs from that of the purely thermal limiter. The switching behavior occurs because of the large change in the refractive index which can be achieved in the solvent due to the thermal nonlinearity. As the index of the $CS_2$ solution decreases, the index matching condition with the ground glass interfaces is destroyed. When the index mismatch becomes severe enough, the incident light, in addition to being thermally defocused, is scattered as well. The transmitted light fluence is dramatically decreased and is clamped below the eye damage threshold for incident energies up to 55 $\mu$J. For incident energies above 55 $\mu$j, the $CS_2$ solution vaporizes, causing a bubble or void in the sample. When this occurs, the transmitted energy switches to 3% of the incident energy since the attenuation now depends only on the scattering efficiency of the ground glass windows, and thermal defocusing no longer has an effect.

FIG. 7 illustrates a second embodiment of the thermal-defocusing/scattering cell or protective element 25 of the hybrid thermal-defocusing/nonlinear-scattering broadband optical limiter of the invention shown in FIGS. 2A, 2B and 2C. FIG. 7 differs from the embodiment of FIG. 5 in that the embodiment of FIG. 7 uses very thin glass microfibers or fumed silica 57 stuffed into the nigrosin/$CH_3Cl$ solution 47 to provide the scattering mechanism. No roughened or ground glass surfaces are needed to provide the scattering mechanism, since that scattering mechanism is provided by the very thin glass microfibers or fumed silica 57 stuffed into the nigrosin/$CH_3Cl$ solution 47. The embodiment of FIG. 7 improves the performance of the thermal/scattering optical limiter of the invention by increasing the amount of scattering surfaces that are in the nigrosin/$CH_3Cl$ solution 47 Furthermore, to provide even more of a scattering mechanism, it should be understood both the scattering ground glass inner surfaces (as shown in FIG. 5) and the scattering very thin glass microfibers or fumed silica 57 stuffed into the nigrosin/$CH_3Cl$ solution 47 (as shown in FIG. 7) could be utilized.

Figure 8:
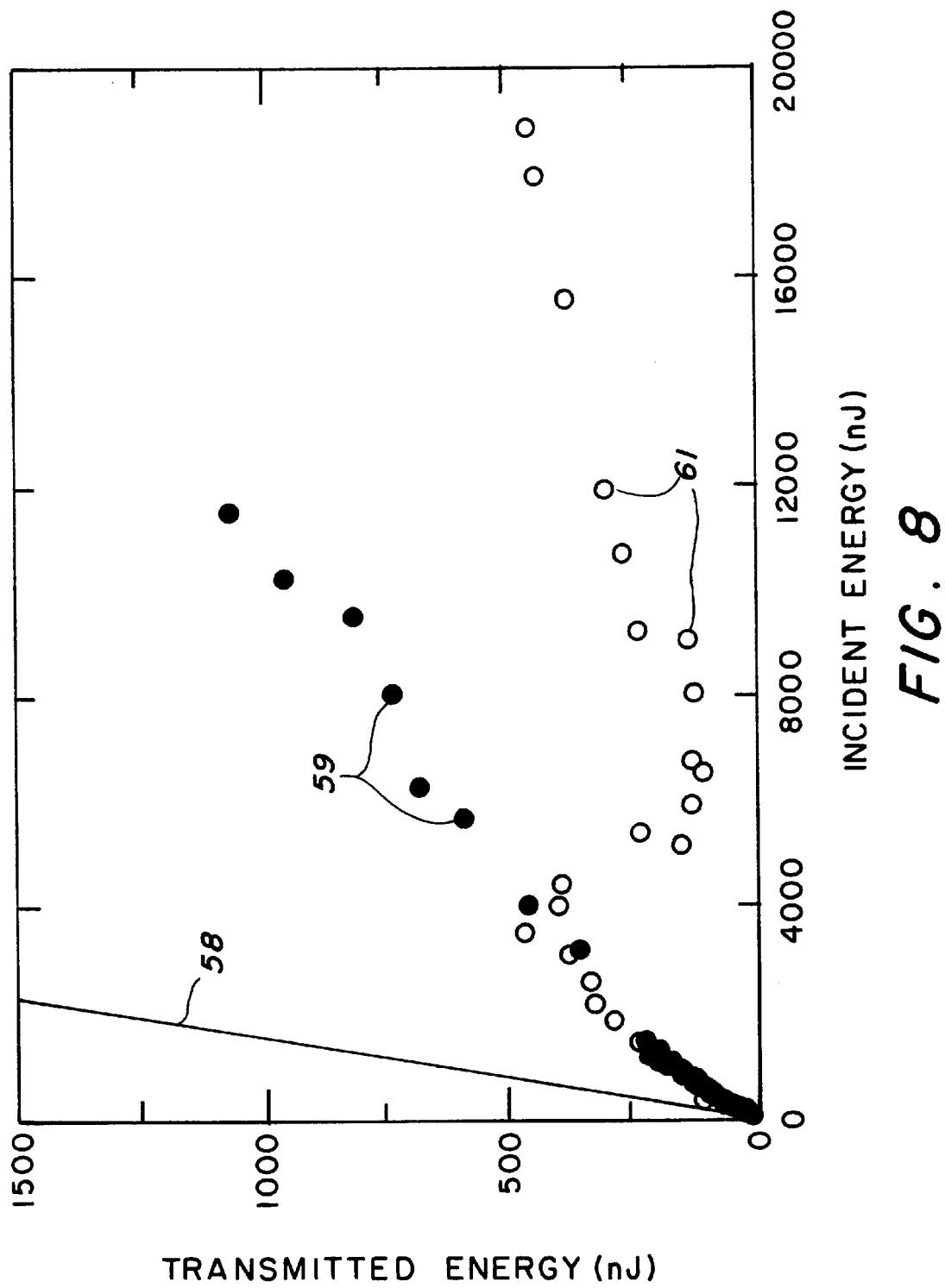
FIG. 8 illustrates experimental data showing the performance of the optical limiter using the protective element of FIG. 7, compared to a broadband thermal limiter without the ground glass.

FIG. 8 illustrates thermal-defocusing/microfiber scattering experimental data showing the performance of the optical limiter using the protective element of FIG. 7, compared to a broadband thermal limiter without the ground glass. The transmitted energy versus incident energy is plotted for a limiter constructed with solutions of nigrosin/ 65% $CH_3Cl$/35% $CS_2$ and polished cell windows 37 and 39 separated by a 50 $\mu$m-thick Teflon gasket or spacer 41A.

The straight line 58 is the system transmission (about 40% due to solution absorption and window reflections at the front and back surfaces of the windows 37 and 39) and represent the light that would be transmitted if no limiting occurs. The solid or filled circles 59 represent purely thermal limiting data obtained by the use of polished windows, as shown in FIG. 3B, without any microfiber scattering. The open circles 61 represent scattering data obtained by the use of a 50 $\mu$m-thick layer of glass microfiber of FIG. 7, as shown in FIG. 3C.

Advantages and New Features of the Invention

There are several advantages that are realized with this invention over the prior art:

a) Dynamic Range

The dynamic range of the eye protection is increased over that of the purely thermal broadband optical limiter of the above-identified now U.S. Pat. No. 5,491,579. If all other experimental conditions are kept constant, inclusion of the scattering hybridization in the thermal-defocusing/ nonlinear-scattering optical limiter extends the range of incident fluences for which the transmitted fluence is below the eye maximum permissible exposure (MPE) threshold. The dynamic range of this invention is about three times greater than that of the limiter in the above-identified patent application Ser. No. 08/251,146 now U.S. Pat. No. 5,491, 579.

b) Damage Threshold

The damage threshold of the hybrid thermal/scatter limiter of the invention is increased over that of the purely thermal optical limiter of the above-identified patent application. In the purely thermal limiter, after the solvent is vaporized, the incident light is focused very near a polished glass/solution interface and optical damage readily occurs. When the solvent is vaporized in the thermal/scatterer hybrid, the incident light is scattered effectively at the first ground glass interface, which can be many microns before the focus of the light. The fluence is less due to the larger beam radius at the interface and hence the device can withstand higher incident fluences prior to damage.

c) All positive features of the purely thermal limiter are maintained with the hybrid thermal/scatterer optical limiter of the invention.

Alternatives

Several different techniques have been envisioned for implementing the thermal/scatterer limiter of the invention. All of these techniques have been tested and shown to exhibit the thermal/nonlinear scattering effect.

a) Optimization of the Scattering from Ground Glass Surfaces

The scattering of light from random, rough dielectric surfaces has been extensively studied both experimentally and theoretically. Most efficient scattering is observed from rough surfaces with deep, steeply sloped scratches. No effort was made to optimize the scattering from the ground glass windows for the hybrid thermal/scatterer optical limiter of the invention. More efficient scattering surfaces should cause the threshold for the effect to be reduced and would limit the transitted fluence to a lower level once the solvent has vaporized.

b) Microfiber Thermal/scatterer Hybrid

Besides scattering from ground glass interfaces, alternative scattering techniques can be used to hybridize with thermal defocusing to achieve a hybrid thermal/scatterer limiter. One technique is to use glass microfibers instead of, or in addition to, ground glass to scatter light (as indicated in FIG. 7). Glass microfibers with an average diameter of a micron or less can be obtained commercially. For example, BASF-1 microfiber having an average diameter of 1 micron can be obtained from Schuller International, Inc. in Colorado. If the 25 $\mu$m thick sample space in the limiter or sample 25 were to be loaded with a 25 $\mu$m thick porous disc of compressed microfiber, the resulting structure would be extremely scattering and essentially opaque when dry. When the cell 25 is loaded with the nigrosin/$CS_2$ solution, the microfiber would become index matched and efficiently transmit light. When irradiated with intense light, as the thermal effect decreases the index of the solution, the light is scattered. This technique has been tested and shown to work using microfiber having an index of refraction of 1.51 and an average diameter of 1 micron. The sample 25 was compressed to a thickness of about 50 $\mu$m and index matching was achieved using a solution composed of 65% chloroform and 35% $CS_2$. The transmission of the sample 25 measured through the fiber disk was 65%, while the transmission through a clear portion of the cell was 70%. The lower transmission through the fiber was due to scattering from a slight mismatch in the indices. The windows used were polished on both sides. The limiting for this hybrid thermal/microfiber scatterer limiter is shown in FIG. 8. The performance of a thermal/microfiber scatterer which has been engineered for most efficient scattering and thermal refraction would be significantly better than the data shown in FIG. 8. (Engineering would involve using pure $CS_2$ as the thermal liquid, using BASF-1 fiber, using submicron-sized fibers, optimizing the absorption, using ground glass in addition to the fiber, and optimizing the thickness and density of the porous fiber disk.)

c) Fumed Silica Thermal/scatterer Hybrid

Another alternative scattering method uses fumed silica to achieve a thermal/scatterer hybrid. Fumed silica is crystalline-free silicon dioxide (also known as colloidal silica or synthetic silica and is manufactured by Cabot Corp. under the trade name Cab-O-Sil). The microscopic structure of fumed silica resembles beads on a necklace. The beads are tens of nanometers in diameter and the chains can be microns in length with extensive crosslinking. When porous, dry fumed silica is loaded into the 25 $\mu$m thick limiting cell (with fused silica windows) the cell is opaque. When index matched with a solution of nigrosin in carbon tetrachloride, the sample becomes transparent. When irradiated with intense light, as the thermal effect decreases the index of the solution, the light is scattered. This technique has been tested and shown to work using fumed silica which was not precompressed into a disc.

d) Porous Glass Thermal/scatterer Hybrid

Another alternative scattering technique uses porous glass, such as Corning porous Vycor glass, Corning porous Nonex glass, or controlled pore glass to achieve a thermal/scatterer hybrid. These porous glasses are all fused silica and could be index matched with a solution of nigrosin in carbon tetrachloride in the limiting cell 25. When irradiated with intense light, as the thermal effect decreases the index of the solution, the light is scattered by the porous structure of the glasses. This technique has been tested and shown to work with Vycor glass or controlled pore glass.

e) Other Scattering Techniques

As described in paragraphs b), c) and d) above, alternative scattering techniques include the use of small glass scattering centers, such as glass microfibers (paragraph b) above), fumed silica (paragraph c) above), and controlled pore glass (paragraph d) above). At extremely high incident light intensities (or fluences), the performance of these scattering materials may be adversely effected if the focused light beam is able to push the material aside, causing a reduction in the scattering efficiency and the subsequent limiting performance. Also described in paragraph d) above was the use of Corning Vycor porous glass. Although this material is solid and cannot be pushed aside, the pore diameter (about 40 angstroms) is smaller than is optimum for efficient visible light scattering. These problems may be alleviated by the fabrication of novel scattering materials utilizing porous sol-gel glass. Alternative materials for use in a thermal-defocusing/scattering limiter based on sol-gel glass technology include:

(1) High Porosity Sol-gel Glass

Sol-gel glass fabrication is a well developed technology for manufacturing high quality glasses with porosities up to 80% of the volume of the glass. They are fabricated from common chemical reagents and do not require high temperature melting or annealing. High porosity sol-gel glasses, such as aerogel glasses, can be fabricated with control over the average pore diameter. Glass with pores that are large enough to efficiently scatter light can be fabricated. Such glass may be used directly in a thermal-defocusing/scattering limiter.

The exceptional scattering efficiencies of the microfiber, fumed silica, and controlled pore glass may be used to greater advantage if incorporated into a matrix composed of a porous sol-gel glass. The sol-gel matrix will act to maintain the integrity of the scattering structure by holding the microfibers or fumed silica fixed, even at high incident light intensities. The indices of refraction of the scattering centers and the porous glass matrix can be matched so that the transmission of the cell, when immersed in the thermal solvent, will be high.

f) Thermal-defocusing/RSA/scattering Hybrid Limiter

In our above-identified U.S. Pat. No. 5,491,579, an alternative technique was described in which the limiting threshold and overall performance of the thermal limiter could be improved by using a material which exhibits reverse saturable absorption (RSA). RSA is simply an intensity dependent excited state absorption, with the absorption increasing with increasing incident intensity. When an RSA material is used in a thermal defocusing limiter, the increased absorption leads to additional solvent heating and enhanced thermal defocusing. In particular, the low to modest fluence limiting is significantly improved in the thermal/RSA hybrid limiter. This was demonstrated and described in our publication "Excited state absorption-enhanced thermal optical limiting in $C_{60}$," by Justus et al., which was published in Optics Letters, Vol 18, 1603 (1993). At high fluences, however, the advantage of the RSA is somewhat diminished. Incorporation of the nonlinear scattering mechanism with a thermal/RSA hybrid limiter should significantly improve the high fluence performance, just as in the case of a purely thermal limiter, by extending the dynamic range as well as the damage threshold. There are many materials, including $C_{60}$, which are known to exhibit RSA that could be used in such a limiter.

g) Thermal-defocusing/CBS/scattering Hybrid Limiter

Carbon black suspensions (CBS) have been extensively studied for optical limiting applications. They contain nanometer-sized particles of carbon black which, when heated by an incident intense laser beam, generate a plasma which then scatters light and attenuates the transmitted beam. If carbon black is suspended in a solvent with a good thermal nonlinearity, in addition to the scattering mechanism, thermal defocusing also can occur. If, in addition to the carbon black, scattering centers, such as microfibers or fumed silica were present, then additional limiting due to scattering from these particles should improve the overall performance of the CBS limiter. Scattering from these particles is possible due to the refractive index mismatch caused by the thermal defocusing.

h. Hollow Glass Microfiber Thermal/scatterer Hybrid

Another alternative scattering technique would use hollow microfibers to achieve a thermal/scatterer hybrid. Glass cylinders could be drawn to micron-sized dimensions and pieces could be loaded into the 25 $\mu$m thick thermal sample cell 25. The nigrosin solution would then fill in the centers of the fibers, as well as the space around them, in order to achieve an index matched condition. When irradiated with intense light, as the thermal effect decreases the index of the solution, the light is scattered. This alternative has not been tested.

Therefore, what has been described in a preferred embodiment of the invention is a passive optical limiter for protecting eyes and sensors from damage due to an incident light beam above a first predetermined value of light intensity. The passive optical limiter comprises: a first optical device for focusing an incident light beam to a focal point; a protective element disposed near the focal point, the protective element being responsive to a focused incident light beam below the first predetermined intensity level for passing therethrough the focused incident light beam below the first predetermined intensity level, the protective element being responsive to a focused incident light beam between the first predetermined intensity level and a higher second predetermined intensity level for deflecting substantially all of the focused incident light beam into rings of light and passing therethrough only a small portion of the converged incident light beam between the first and second predetermined intensity levels, and the protective element including a scattering element responsive to incident light at or above the second predetermined intensity level for scattering that incident light in all directions to decrease the intensity level of the incident light below a damage threshold of the light sensitive object; and a second optical device for directing substantially all of the light passing through the protective element and the second optical device onto the light-sensitive object.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A passive optical limiter for protecting a light-sensitive object from damage due to an incident light beam above a first predetermined value of light intensity, said passive optical limiter comprising:

first optical means for focusing an incident light beam to a focal point;

a protective element disposed near the focal point, said protective element being responsive to a focused incident light beam below the first predetermined intensity level for passing therethrough the focused incident light beam below the first predetermined intensity level, said protective element being responsive to a focused incident light beam between the first predetermined intensity level and a higher second predetermined intensity level for deflecting by way of thermal defocusing substantially all of the focused incident light beam into rings of light and passing therethrough only a small portion of the converged incident light beam between the first and second predetermined intensity levels, and said protective element including means responsive to incident light at or above the second predetermined intensity level for scattering that incident light in all directions to decrease the intensity level of the incident light below a damage threshold of the light sensitive object; and second optical means for focusing substantially all of the light passing through said protective element and said second optical means onto the light-sensitive object.

2. The passive optical limiter of claim 1 wherein said protective element comprises:

a cell;

a solution of absorbing material dissolved in a solvent, said solution being disposed in said cell and possessing refractive thermal nonlinearities, said solution dissolved in said solvent being responsive to the focused incident light beam between the first and second predetermined intensity levels for deflecting substantially all of said light between the first and second predetermined intensity levels into rings of light; and means disposed in said cell being responsive to the focused incident light beam above the second predetermined intensity level for scattering that incident light in all directions.

3. The passive optical limiter of claim 2 wherein said scattering means includes:

a gasket;

first and second windows disposed in said cell and separated by said gasket, each of said first and second windows having an outer polished surface and an inner roughened surface to produce a highly scattering random rough inner surface.

4. The passive optical limiter of claim 3 wherein:

each of said first and second windows has an index of refraction that substantially matches that of said solvent.

5. The passive optical limiter of claim 3 wherein:

said gasket is a teflon gasket;

each of said first and second windows is a BASF-1 window having a preselected diameter and thickness;

said cell is a stainless steel cell holding said first and second windows separated by said teflon gasket; and said scattering means further includes an o-ring for sealing said solution between said first and second windows of said cell.

6. The passive optical limiter of claim 2 wherein said scattering means includes:

glass microfibers contained in said solution in said cell.

7. The passive optical limiter of claim 6 wherein:

said glass microfibers have an average diameter of approximately one micron or less.

8. The passive optical limiter of claim 6 wherein:

said glass microfibers include BASF-1 microfibers having an average diameter of approximately one micron or less.

9. The passive optical limiter of claim 2 wherein:

said absorbing material being responsive to a portion of the converged incident light beam between the first and second predetermined intensity levels for heating up and transferring heat to said solvent; and said solvent having a sufficiently large thermal figure of merit to provide a predetermined limiting threshold for protecting a light sensitive object from damage due to a light beam with a value of light intensity between the first and second intensity levels and being responsive to the heat transferred from said heated absorbing material for thermally defocusing substantially all of the converged incident light beam between the first and second predetermined intensity levels.

10. The passive optical limiter of claim 2 wherein:

said solution of absorbing material is a solution of nigrosin; and said solvent is carbon disulfide.

11. The passive optical limiter of claim 10 wherein:

said nigrosin has an extremely broad and flat absorption over the entire near ultraviolet, visible and near infrared spectral regions.

12. The passive optical limiter of claim 10 wherein:

said nigrosin acts to absorb light and then transfer heat to said carbon disulfide solvent.

13. The passive optical limiter of claim 1 further including:

a collecting aperture disposed in front of said second optical means for only passing therethrough into said second optical means light below the first predetermined intensity level, only a small portion of any focused incident deflected light between the first and second predetermined intensity levels and only a small portion of any scattered light at or above the second predetermined intensity level.

14. The passive optical limiter of claim 1 wherein:

said first optical means is a focusing lens.

15. The passive optical limiter of claim 1 wherein:

said second optical means is a imaging lens.

16. A broadband thermal optical limiter for protecting a light-sensitive object from intense laser beams at all near ultraviolet, visible and near infrared wavelengths above a first predetermined value of light intensity, said optical limiter comprising:

a sample cell containing a solution of absorbing material dissolved in a solvent;

first optical means for converging an incident laser beam into said sample cell, said sample cell being responsive to a converged incident laser beam below the first predetermined intensity level for substantially passing therethrough the converged incident laser beam below the first predetermined intensity level, said sample cell being responsive to a converged incident laser beam between the first predetermined intensity level and a higher second predetermined intensity level for deflecting substantially all of the focused incident light beam into rings of light and passing therethrough only a small portion of the converged incident laser beam between the first and second predetermined intensity levels, and said sample cell including means responsive to incident light at or above the second predetermined intensity level for scattering the incident light in all directions to decrease the intensity level of the incident light below a damage threshold of the the light sensitive object; and second optical means for focusing substantially all of the laser beam passing through said sample cell and into said second optical means into the light-sensitive object to be protected.

17. The passive optical limiter of claim 16 wherein said protective element comprises:

a cell;

a solution of absorbing material dissolved in a solvent, said solution being disposed in said cell and possessing refractive thermal nonlinearities, said solution dissolved in said solvent being responsive to the focused incident light beam between the first and second predetermined intensity levels for deflecting substantially all of said light between the first and second predetermined intensity levels into rings of light; and means disposed in said cell being responsive to the focused incident light beam above the second predetermined intensity level for scattering that incident light in all directions.

18. The passive optical limiter of claim 17 wherein said scattering means includes:

a gasket;

first and second windows disposed in said cell and separated by said gasket, each of said first and second windows having an outer polished surface and an inner roughened surface to produce a highly scattering random rough inner surface.

19. The passive optical limiter of claim 18 wherein:

each of said first and second windows has an index of refraction that substantially matches that of said solvent.

20. The passive optical limiter of claim 18 wherein:

said gasket is a teflon gasket;

each of said first and second windows is a BASF-1 window having a preselected diameter and thickness;

said cell is a stainless steel cell holding said first and second windows separated by said teflon gasket; and said scattering means further includes an o-ring for sealing said solution between said first and second windows of said cell.

21. The passive optical limiter of claim 18 wherein said scattering means includes:

glass microfibers contained in said solution in said cell.

22. The passive optical limiter of claim 21 wherein:

said glass microfibers have an average diameter of approximately one micron or less.

23. The passive optical limiter of claim 21 wherein:

said glass microfibers include BASF-1 microfibers having an average diameter of approximately one micron or less.

24. The passive optical limiter of claim 17 wherein:

said absorbing material being responsive to a portion of the converged incident light beam between the first and second predetermined intensity levels for heating up and transferring heat to said solvent; and said solvent having a sufficiently large thermal figure of merit to provide a predetermined limiting threshold for protecting a light sensitive object from damage due to a light beam with a value of light intensity between the first and second intensity levels and being responsive to the heat transferred from said heated absorbing material for thermally defocusing substantially all of the converged incident light beam between the first and second predetermined intensity levels.

25. The optical limiter of claim 16 wherein:

first optical means focuses the incident laser beam to a focal point in said sample cell.

26. The optical limiter of claim 17 wherein:

said absorbing material acts to absorb light and then transfer heat to said solvent.

27. The optical limiter of claim 17 wherein:

said solution of absorbing material is a solution of nigrosin; and said solvent is carbon disulfide.

28. The optical limiter of claim 27 wherein:

said nigrosin has an extremely broad and flat absorption over the entire near ultraviolet, visible and near infrared spectral regions.

29. The optical limiter of claim 27 wherein:

said nigrosin acts to absorb light and then transfer heat to said carbon disulfide solvent.

30. The optical limiter of claim 27 wherein:

said first optical means is a focusing lens; and said second optical means is an imaging lens.

31. The optical limiter of claim 27 wherein:

said first optical means converges the incident laser beam to a focal point in said sample cell.

* * * * *